3,749,730
CERTAIN N-BENZOYL-1,2,5,6-TETRAHYDRO-
PYRIDINES
Don R. Baker, Orinda, Calif., assignor to Stauffer
Chemical Company, New York, N.Y.
No Drawing. Filed Feb. 10, 1972, Ser. No. 225,272
Int. Cl. C07d 31/28
U.S. Cl. 260—297 R  5 Claims

ABSTRACT OF THE DISCLOSURE

Compounds of the formula

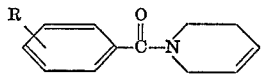

wherein R is alkyl having 1 to 4 carbon atoms, alkoxy having 1 to 4 carbon atoms or halogen and their use as insect repellents.

---

This invention relates to certain novel substituted benzoyl piperideines and their use as insect repellents.

The compounds of this invention has the formula

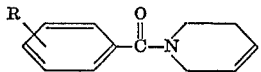

wherein R is alkyl having 1 to 4 carbon atoms, preferably methyl, more preferably m-methyl; alkoxy having 1 to 4 carbon atoms, preferably methoxy, more preferably o-methoxy or halogen, preferably chlorine or fluorine.

The compounds can be prepared by reacting a compound of the formula

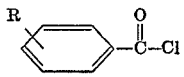

in which R is as defined with the compound 1,2,3,6 tetrahydropyridene having the formula

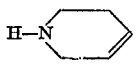

The 1,2,3,6 tetrahydropyridene is slowly added to a solution of the substituted benzoyl chloride in a solvent such as chloroform at a temperature under 30° C. in the presence of HCl acceptor such as triethylamine.

Preparation of the compounds of this invention is illustrated by the following example:

EXAMPLE I 1-(m-toluoyl)-3-piperideine

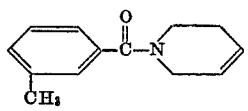

7.7 grams (0.05 mole) in toluoyl chloride is dissolved in 100 milliliters chloroform. 4.6 milliliters 1,2,3,6 tetrahydropyridene and 8.0 milliliters triethyl amine are added to the solution over a 10 minute period with cooling keeping the temperature under 30° C. The mixture is allowed to stand for 3 hours. The reaction product is recovered by washing the mixture with 100 milliliters water and 100 milliliters saturated $NaHCO_3$ solution. The washed mixture is dried over $MgSO_4$ and evaporated to yield 10.5 grams of a compound corresponding to the desired structure. $N_D^{30}$—1.5530. The structure is confirmed by n.m.r.

1-(o-fluorobenzoyl)-3-piperidene, 1-(o-chlorobenzoyl)-3 - piperideine, 1-(p-bromobenzoyl)-3-piperideine, 1-(p-butylbenzoyl) - 3 - piperidene, 1-(o-methoxybenzoyl)-3-piperidene, and 1 - (m-butoxybenzoyl)-3-piperidene are also prepared in a similar manner according to the general method described for preparing the compounds of this invention.

The following test description and results illustrate the use of the compounds of this invention as insect repellents.

Housefly repellent test

Each test cage consists of a tule-covered number 116, 16 oz. waxed paper Dixie® cup with two ¾ oz. waxed paper condiment cups stapled on opposite sides of the upper, interior perimeter. One of the cups contains a sugar cube saturated with 0.8 milliliter of acetone containing a specific concentration of the test repellent and allowed to dry. The second condiment cup contains a water-saturated cotton plug. After each cube has been treated and allowed to dry, it is carefully weighed and placed in the test cage. One hundred houseflies of mixed sexes are then placed in the cages and all of the cages are placed on a 1½ r.p.m. turntable. This procedure keeps the flies in random distribution within the cage and eliminates their gathering on the cage walls due to a phototropic response to outside light sources, which gathering has been found to give a false appearance of repellency by the sugar cube. At daily intervals after treatment, the flies in each cage are anesthesized with $CO_2$. The cube is removed, reweighed and the percentage weight loss of the cube (due to consumption by the flies) is recorded. The cubes with the least weight loss are considered to be the most repellent to the flies. Table I contains a summary of the first, second, and fourth day readings for the candidate repellent at 1% concentration.

TABLE I

[Percentage weight loss of repellent treated sugar cubes due to consumption by houseflies—1% concentration]

| Compound | 24 hrs. | 48 hrs. | 96 hrs. |
| --- | --- | --- | --- |
| 1-(m-toluoyl)-3-piperideine | .02 | 6.6 | 20.0 |
| 1-(o-fluorobenzoyl)-3-piperidene | .16 | 10.3 | 28.1 |
| 1-(o-chlorobenzoyl)-3-piperideine | 1.7 | 10.7 | 26.4 |
| Acetone only (control) | 10.3 | 21.4 | 45.3 |

I claim:
1. A compound of the formula

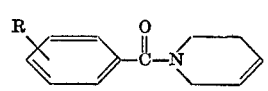

wherein R is alkyl having 1 to 4 carbon atoms, alkoxy having 1 to 4 carbon atoms or halogen.
2. The compound of claim 1 in which R is m-methyl.
3. The compound of claim 1 in which R is o-fluoro.
4. The compound of claim 1 in which R is o-chloro.
5. The compound of claim 1 in which R is m-methoxy.

References Cited
UNITED STATES PATENTS
3,209,006  9/1965  Wragg et al.  260—297 R ALAN L. ROTMAN, Primary Examiner U.S. Cl. X.R.
260—293.77; 424—263